United States Patent
Kim

(10) Patent No.: US 12,524,798 B2
(45) Date of Patent: Jan. 13, 2026

(54) METHOD FOR PROVIDING SHOPPING INFORMATION BY USING ARTIFICIAL NEURAL NETWORK MODEL AND ELECTRONIC DEVICE PERFORMING SAME

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 41 days.

(21) Appl. No.: 18/780,496

(22) Filed: Jul. 23, 2024

(65) Prior Publication Data
US 2024/0378660 A1 Nov. 14, 2024

Related U.S. Application Data

(63) Continuation of application No. 17/129,955, filed on Dec. 22, 2020, now Pat. No. 12,079,856, which is a (Continued)

(30) Foreign Application Priority Data

Dec. 28, 2018 (KR) .......................... 10-2018-0172937

(51) Int. Cl.
G06Q 30/00 (2023.01)
G06F 16/9538 (2019.01)
(Continued)

(52) U.S. Cl.
CPC ..... *G06Q 30/0633* (2013.01); *G06F 16/9538* (2019.01); *G06F 18/214* (2023.01);
(Continued)

(58) Field of Classification Search
CPC ................................................ G06Q 30/0633
See application file for complete search history.

(56) References Cited

U.S. PATENT DOCUMENTS

2015/0163345 A1 6/2015 Cornaby et al.
2021/0117948 A1* 4/2021 Voss ..................... G06F 18/40

FOREIGN PATENT DOCUMENTS

| CN | 108052519 A | 5/2018 |
| CN | 108921855 A | 11/2018 |
| JP | 2007-133627 A | 5/2007 |

OTHER PUBLICATIONS

López-de-Ipiña, Diego, Tania Lorido, and Unai López. "Blindshopping: enabling accessible shopping for visually impaired people through mobile technologies." International Conference on Smart Homes and Health Telematics. Springer, Berlin, Heidelberg, 2011.*

(Continued)

*Primary Examiner* — Kathleen Palavecino
(74) *Attorney, Agent, or Firm* — INVENSTONE PATENT, LLC

(57) ABSTRACT

The present disclosure relates to a method for providing shopping information by using artificial neural network model and an electronic device performing the same. The method comprises: acquiring a product image using a camera module, displaying the product image on a display module, recognizing a product information including a trademark and a product information label by inputting the product image into an AI recognition model including an artificial neural network model, converting the product information into a query when the product information is recognized by the AI recognition model, transmitting the query to a server via a communication module, receiving a shopping information corresponding to the product information with respect to one or more shopping malls from the server via the communication module; and displaying the shopping information on the display module. The parameters of the artificial neural network are updated periodically by receiving the parameters via the server.

20 Claims, 5 Drawing Sheets

Related U.S. Application Data continuation of application No. PCT/KR2019/012373, filed on Sep. 24, 2019.

(51) Int. Cl.
    *G06F 18/214*    (2023.01)
    *G06F 18/40*    (2023.01)
    *G06N 3/04*    (2023.01)
    *G06N 3/08*    (2023.01)
    *G06Q 30/0601*    (2023.01)
    *G06V 10/764*    (2022.01)
    *G06V 10/82*    (2022.01)
    *G06V 10/94*    (2022.01)
    *G06V 20/20*    (2022.01)
    *H04N 23/63*    (2023.01)
    *G06F 3/0481*    (2022.01)

(52) U.S. Cl.
CPC ............... *G06F 18/40* (2023.01); *G06N 3/04* (2013.01); *G06N 3/08* (2013.01); *G06Q 30/0623* (2013.01); *G06Q 30/0643* (2013.01); *G06V 10/764* (2022.01); *G06V 10/82* (2022.01); *G06V 10/95* (2022.01); *G06V 20/20* (2022.01); *H04N 23/63* (2023.01); *G06F 3/0481* (2013.01)

(56) References Cited

OTHER PUBLICATIONS

Chinese Notice of Allowance dated Feb. 18, 2025 issued on Application No. 201980086654.

"The way to make training data for deep learning model to recognize keywords in product catalog image at E-commerce", Korea Intelligent Information System Society, Journal of Intelligence and Information Systems, vol. 24 Issue 1 / pp. 1-23 / 2018.

\* cited by examiner

METHOD FOR PROVIDING SHOPPING INFORMATION BY USING ARTIFICIAL NEURAL NETWORK MODEL AND ELECTRONIC DEVICE PERFORMING SAME

CROSS-REFERENCE TO RELATED APPLICATIONS

This application is a continuation application of U.S. patent application Ser. No. 17/129,955, filed on Dec. 22, 2020, which is a continuation of International Application No. PCT/KR2019/012373, with an international filing date of Sep. 24, 2019, which claims the benefit of priority to Korean Application No. 10-2018-0172937, filed on Dec. 28, 2018, in the Korean Intellectual Property Office, the disclosures of which are incorporated herein by reference.

BACKGROUND OF THE DISCLOSURE

Field of the Invention

The present disclosure relates to a method for providing shopping information by product and an electronic device performing the same and, more particularly, to a method for providing shopping information by product using an artificial intelligence (AI) recognition model obtained by machine learning of an artificial neural network, and an electronic device performing the same.

Description of the Background Art

In operations of conventional online product purchasing systems, first, to purchase a product, a consumer accesses an online shopping mall server which is known to the consumer, through a web browser installed in a terminal. Then, the shopping mall server transmits webpage information containing information on various products to the corresponding terminal through the Internet and displays it on a screen of the terminal. At this time, after a user of the terminal checks various types of text information or image information on products provided by the shopping mall server while browsing webpage information of the shopping mall server displayed on the screen, if there is a product desired by the user, the user selects the desired product and then presses a purchase button, and the shopping mall server receives payment through an electronic payment scheme and sends the paid product in an offline manner.

However, in the conventional online product purchasing system as described above, since consumers need to figure out information regarding their desired products by finding the products individually through product searching after accessing the Internet each time to purchase the desired product, it is very cumbersome and inconvenient. In an offline store, if there is a desired product, it is necessary to remember a name of the product and search for the product online, leading to difficulties in accurately searching for or purchasing the product. Further, there is a problem that product price inquiry, product information inquiry, and product purchase could not be performed at all.

SUMMARY OF THE DISCLOSURE

Accordingly, the present disclosure is developed to solve the above problems. An aspect of the present disclosure provides a method for providing shopping information by product, the method capable of capturing an image of a product that a user wants to purchase with a camera to acquire product information of the product and capable of providing shopping information corresponding to the acquired product information to the user in real time. Another aspect of the present disclosure provides an electronic device for performing the method.

According to an aspect of an exemplary embodiment, there is provided a method for providing shopping information by product according to an embodiment of the present disclosure, comprises: an image acquisition step in which a camera-associated app linked to a camera module acquires a product image through the camera module; a recognition step in which an AI recognition model obtained by machine learning of an artificial neural network receives the product image and recognizes product information; a transmission step in which a communication module transmits the product information to a server; a receiving step in which the communication module receives, from the server, shopping information corresponding to the product information; and a display step in which a display module displays the shopping information on a screen.

In the image acquisition step, the camera-associated app may acquire the product image in real time when a product is displayed on a camera-working screen after the camera-working screen is displayed on the screen.

In the transmission step, the product information recognized is converted into a query form, and the communication module may transmit the product information which is converted into the query form to the server.

In the recognition step, a purchase input window for confirming with a user whether to purchase is displayed, along with the product information recognized, on the screen, and when a user input is received through the purchase input window, the transmission step may be performed.

In the recognition step, a shape image of a product corresponding to the product information may be further displayed on the screen.

In the recognition step, if the AI recognition model does not recognize the product information, a user input mode, together with recognition failure information, is displayed on the screen, and product information input through the user input mode may be recognized as the product information.

In the recognition step, an error input window and the product information recognized by the AI recognition model are displayed on the screen, together, and when the error input window is selected, a user input mode is displayed on the screen and product information input through the user input mode may be recognized as the product information.

In the receiving step and the display step, the shopping information may include lowest price information.

According to another aspect of an exemplary embodiment, there is provided an electronic device for providing shopping information by product according to another embodiment of the present disclosure, comprises: a camera module for capturing a product image; an AI recognition model which consist of a machine learned artificial neural network and which receives the product image and outputs product information; a display module for displaying the product image captured through the camera module; a communication module for transmitting the product information output from the AI recognition model to a server; and a processor, wherein the processor performs control so that the product image acquired through a camera-associated app linked to the camera module is provided to the AI recognition model, performs control so that the product information is transmitted to the server by providing the product information output from the AI recognition model to the communication module, and performs control so that shopping information corresponding to the product information received from the server through the communication module is displayed on a screen through the display module.

The product image acquired through the camera-associated app may be acquired in real time by the camera-associated app when a product is displayed on a camera-working screen after the camera-working screen is displayed on the screen.

The AI recognition model is obtained by machine learning of the artificial neural network with big data prepared in advance, the big data includes a training set, and the training set may include a plurality of product images and product information labels corresponding to each of the product images.

The AI recognition model may be a chip which is physically configured separately from the processor.

The AI recognition model may be embedded in the processor.

The processor may perform control so that the product information recognized is converted into a query form and the communication module transmits the product information which is converted into the query form to the server.

The processor displays a purchase input window for confirming with a user whether to purchase, along with the product information recognized, on the screen, and when a user input is received through the purchase input window, the processor may perform control so that the product information recognized is transmitted to the server through the communication module.

The processor may perform control so that a shape image of a product corresponding to the product information is further displayed on the screen through the display module.

If the AI recognition model does not recognize the product information, the processor may perform control so that a user input mode, together with recognition failure information, is displayed on the screen, and recognize product information input through the user input mode as the product information.

The processor performs control so that an error input window and the product information recognized by the AI recognition model are displayed on the screen, and when the error input window is selected, the processor may perform control so that a user input mode is displayed on the screen, and recognize product information input through the user input mode as the product information.

The shopping information may include lowest price information.

In case of using a method for providing shopping information by product and an electronic device performing the same according to an embodiment of the present disclosure, there are advantages of acquiring product information of the product by capturing the product that a user wants to purchase with a camera and providing shopping information corresponding to the captured product information to the user in real time.

In addition, it is advantageous in terms of maximizing the convenience of use for the user since users can acquire shopping information by simply capturing the product without accessing to a specific shopping mall through the Internet and inputting the desired product through a keyboard or virtual keyboard.

DETAILED DESCRIPTION OF THE DISCLOSURE

Figure 1:
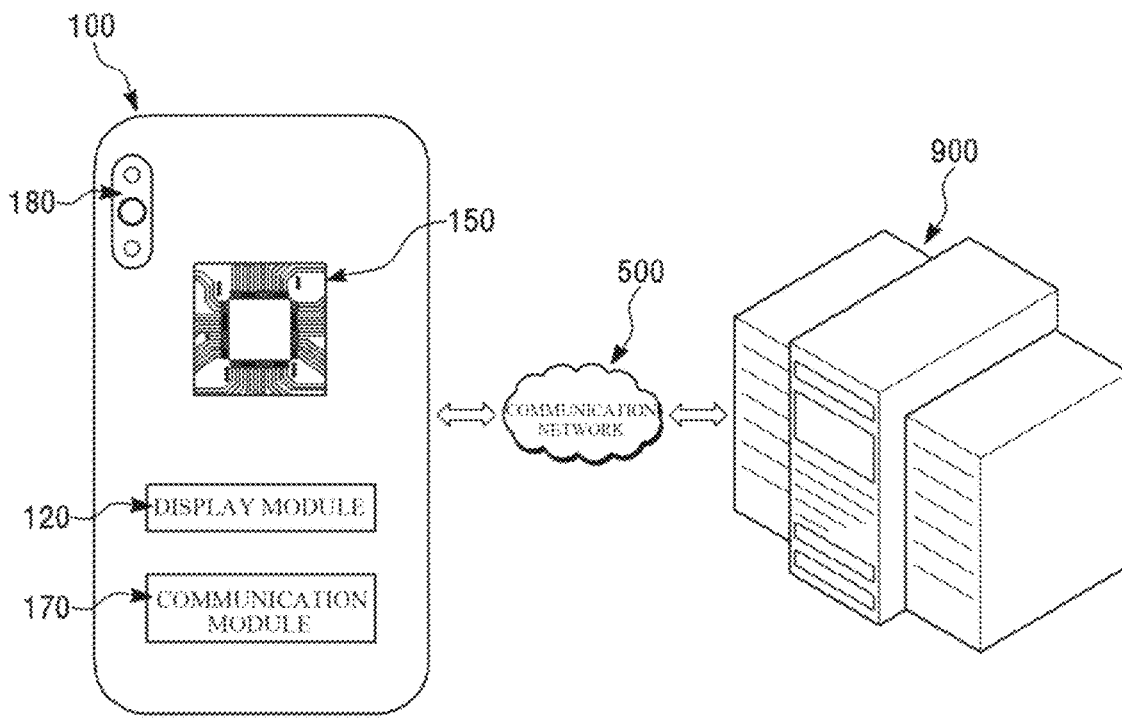
FIG. 1 is a schematic diagram of a system for providing shopping information, in which a method for providing shopping information by product is performed, according to an embodiment of the present disclosure.

In the following detailed description of the present disclosure, references are made to the accompanying drawings that show, by way of illustration, specific embodiments in which the invention may be practiced. These embodiments are described in sufficient detail to enable those skilled in the art to practice the invention. It is to be understood that the various embodiments of the present disclosure are different from each other, but do not need to be exclusive. For example, specific shapes, structures and characteristics described herein may be implemented as modified from one embodiment to another without departing from the spirit and scope of the invention. Furthermore, it shall be understood that the locations or arrangements of individual elements within each embodiment may also be modified without departing from the spirit and scope of the invention. Accordingly, the detailed description hereinafter is not intended to have a limited meaning, and the range of right of the present disclosure is restricted by only the attached claims along with the entire range equivalent to things claimed by the claims, if it is appropriately described. In the drawings, like reference numerals refer to the same or similar elements throughout the several views.

FIG. 1 is a schematic diagram of a system for providing shopping information, in which a method for providing shopping information by product is performed, according to an embodiment of the present disclosure.

Referring to FIG. 1, a system for providing shopping information according to an embodiment of the present disclosure includes an electronic device 100, a communication network 500, and a server 900.

The electronic device 100 according to the embodiment of the present disclosure may be a smartphone as illustrated in FIG. 1, but is not limited thereto. Examples of the electronic device 100 include a personal computer (PC), a tablet PC, a laptop computer, a smart TV, and the like. The electronic device 100 may refer to various types of electronic devices that include a display module (120), a communication module (170), and a camera module (180) and that transmit and receive data to and from the server 900 via the communication network 500.

The electronic device 100 includes a processor 150 that controls overall driving of the electronic device 100.

Figure 2:
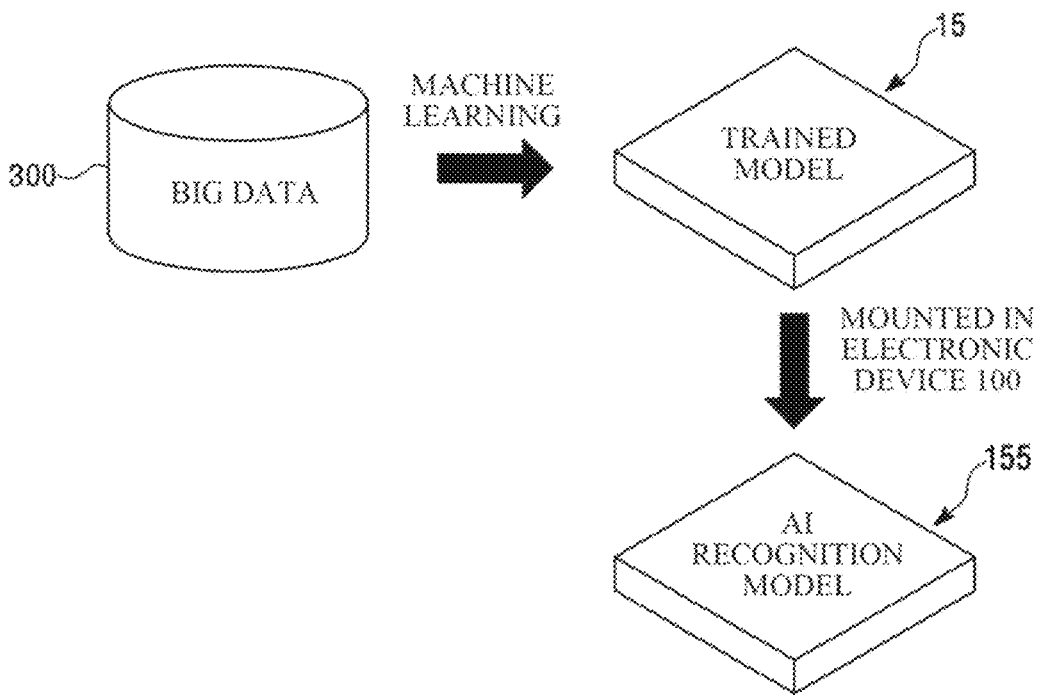
FIG. 2 is a schematic diagram for explaining an AI recognition model 155.

The processor 150 may include the artificial intelligence (AI) recognition model 155 illustrated in FIG. 2. For example, the processor 150 may be any one of a central processing unit (CPU), a graphics processing unit (GPU), a microcontroller unit (MCU), a digital signal processor (DSP), and a neural processing unit (NPU), which has the AI recognition model 155. In addition, the processor 150 may be a system-on-chip (SoC) including all of an AI recognition model, a CPU, a GPU, an MCU, a DSP, and an NPU.

Meanwhile, the AI recognition model 155 illustrated in FIG. 2 is not included in the processor 150 illustrated in FIG. 1, but may be mounted in the electronic device 100 as a separate chip. The AI recognition model 155 configured as a separate dedicated chip may be driven and controlled by the processor 150.

The processor 150 may include an artificial neural network computing device. The artificial neural network computing device may perform computation required by the AI recognition model 155. Here, the AI recognition model 155 may be a "trained model," which is pre-trained in a separate machine learning device and embedded in the artificial neural network computing device inside the processor 150.

The processor 150 may include an artificial neural network computing device. The artificial neural network computing device may perform computation required by the AI recognition model 155. Here, the AI recognition model 155 may be a 'trained model' trained in a separate machine learning device and embedded in the artificial neural network computing device inside the processor 150.

FIG. 2 is a schematic diagram for explaining the AI recognition model 155 included in the electronic device 100.

The AI recognition model 155 illustrated in FIG. 2 may be embedded in the processor 150 illustrated in FIG. 1 as described above, or may be configured as a chip physically separate from the processor 150.

As illustrated in FIG. 2, a trained model 15, which undergoes machine learning with a storage of big data 300 that is prepared in advance, may be mounted in the electronic device 100 to thereby become the AI recognition model 155.

The trained model 15 may be generated in a separate machine learning device (not shown). In such a machine learning device, the trained model 15 may be obtained by allowing an artificial neural network prepared in advance to be repeatedly machine learned with the big data 300. It will be described in more detail with reference to FIG. 3A and FIG. 3B.

Figure 3A:
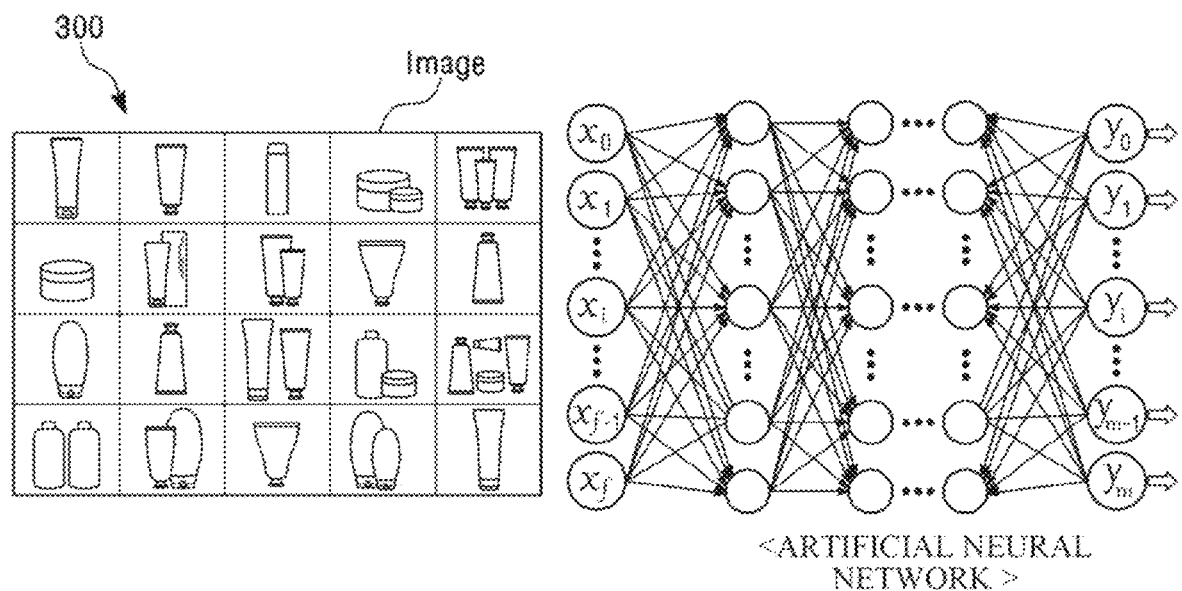
FIGS. 3A and 3B are diagrams for explaining examples of machine learning methods for acquiring a trained model 15 illustrated in FIG. 2.

Referring to FIG. 3A and one example of a machine learning method for acquiring the trained model 15 shown in FIG. 2, the big data 300 is repeatedly provided to a fully connected artificial neural network as illustrated in the right side of the figure, so that the artificial neural network is machine learned, thereby obtaining the trained model 15 illustrated in FIG. 2.

As an example of an artificial neural network, the artificial neural network may include an input node ($x_0$, $x_1$, ..., $x_i$, ..., $x_{f-1}$, $x_f$) into which an image is input, an output node ($y_0$, $y_1$, ..., $y_i$, ..., $y_{m-1}$, $y_m$) which outputs product information of the input image, hidden nodes between the input node (x0, x1, ..., xi, ..., xf-1, xf) and the output node (y0, y1, ..., yi, ..., ym-1, ym), and multiple associated parameters (weight) between the output node (y0, y1, ..., yi, ..., ym-1, ym) and the input node (x0, x1, ..., xi, ..., xf-1, xf).

The input node (x0, x1, ..., xi, ..., xf-1, xf) is a node configuring an input layer and receives an image from the outside, and the output node (y0, y1, ..., yi, ..., ym-1, ym) is a node configuring an output layer and outputs predetermined output data to the outside. The hidden nodes disposed between the input node (x0, x1, ..., xi, ..., xf-1, xf) and the output node (y0, y1, ..., yi, ..., ym-1, ym) are nodes configuring a hidden layer and connect output data of the input node (x0, x1, ..., xi, ..., xf-1, xf) to input data of the output node (y0, y1, ..., yi, ..., ym-1, ym). Three hidden layers are illustrated in FIG. 3A, but according to an embodiment, a neural network circuit may be implemented by disposing a plurality of hidden layers, for example, two or four or more hidden layers, between the input layer and the output layer.

Each input node ($x_0$, $x_1$, ..., $x_i$, ..., $x_{f-1}$, $x_f$) of the input layer may be fully connected or incompletely connected to each output node (y0, y1, ..., yi, ..., ym-1, ym) of the output layer, as illustrated in FIG. 3A.

The input node (x0, x1, ..., xi, ..., xf-1, xf) serves to receive input data from the outside and deliver it to the hidden node. Then, a practical calculation is performed in the hidden node. After output data is output from the hidden node, the output node (y0, y1, ..., yi, ..., ym-1, ym) receives the output data and performs calculation again. When performing calculations in the hidden node and the output node (y0, y1, ..., yi, ..., ym-1, ym), the calculation is performed by multiplying the input data that is input to an own node by a predetermined associated parameter (or weight, w). After resultant calculation values performed in respective nodes are summed (weighted sum), predetermined output data is output by passing the sum through a preset activation function.

The hidden node and the output node (y0, y1, ..., yi, ..., ym-1, ym) have an activation function. The activation function may be one among a step function, a sign function, a linear function, a logistic sigmoid function, a hyper tangent function, a ReLU function, and a softmax function. The activation function may be appropriately determined by a skilled person according to a learning method of an artificial neural network.

The artificial neural network performs machine learning by repeatedly updating or modifying the associated parameter (w) to an appropriate value. Representative methods of machine learning by the artificial neural network include supervised learning and unsupervised learning.

Supervised learning is a learning method in which the associated parameter (w) is updated so that output data obtained by putting the input data into the neural network becomes close to the target data when there is a clearly defined target output data that is expected to be computed by an arbitrary neural network from input data. A multilayer structure of FIG. 3A may be generated based on supervised learning.

Figure 3B:
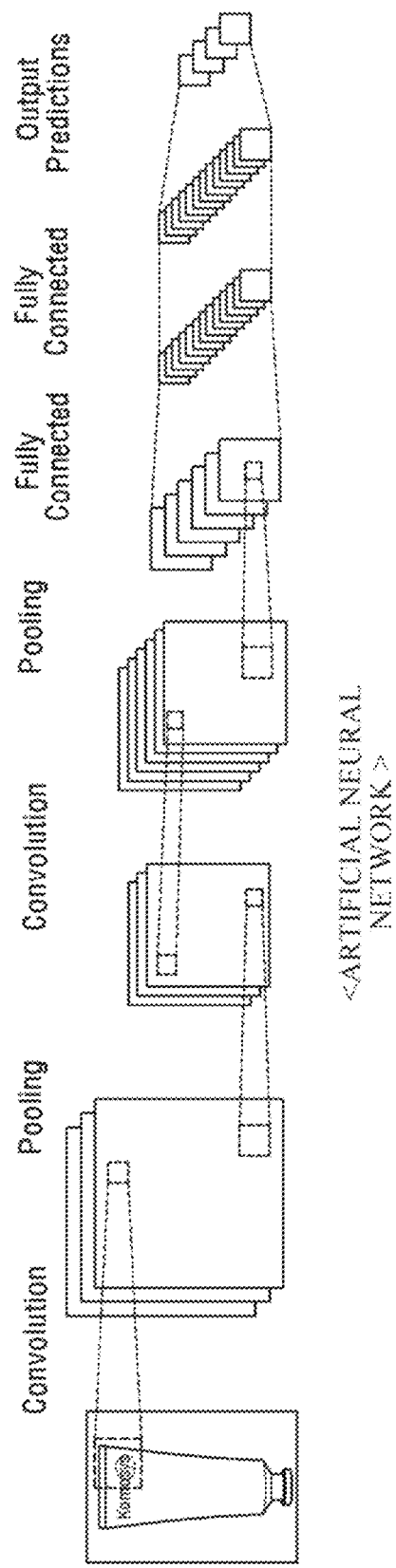

Referring to FIG. 3B, illustrating another example of the artificial neural network, there is a convolutional neural network (CNN), which is a type of deep neural network (DNN). A convolutional neural network (CNN) is a neural network having one or several convolutional layers, a pooling layer, and a fully connected layer. The convolutional neural network (CNN) has a structure suitable for training two-dimensional data and can be trained through a back-propagation algorithm. It is one of the representative models of DNN that is widely used in various application fields such as object classification and object detection in images.

Here, it should be noted that the artificial neural network of the present disclosure is not limited to the artificial neural networks shown in FIGS. 3A and 3B, and the trained model 15 may be obtained by machine learning the big data in various other artificial neural networks.

Figures 4, 5:
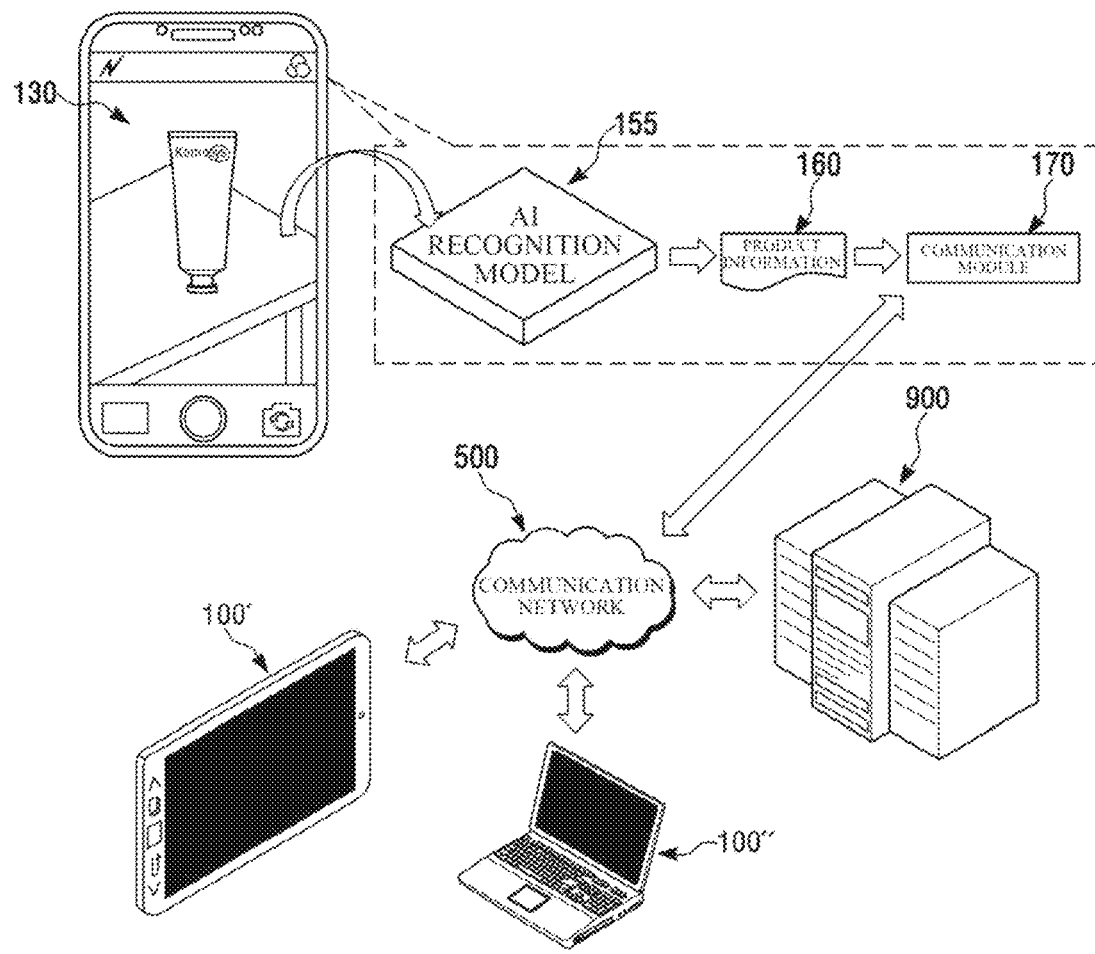
FIG. 4 is a diagram illustrating an example of a training set.
FIG. 5 is a diagram illustrating a method for providing shopping information by product according to an embodiment of the present disclosure.

Referring to FIG. 2 again, the big data 300, which is prepared in advance, includes a training set for machine learning of the artificial neural network described above. As illustrated in FIG. 4, the training set of the big data 300 includes a plurality of product images and product information labels of the corresponding product images. Product information labels (Label 1, . . . , Label 10, . . . , Label 100, . . . , Label 1000) corresponding to each of a plurality of product images (Image 1, . . . , Image 10, . . . , Image 100, . . . , Image 1000) are prepared in advance. The prepared training set may be provided to the artificial neural network illustrated in FIG. 3A or 3B to acquire the trained model 15 illustrated in FIG. 2. The obtained, trained model 15 is mounted in the electronic device 100 as illustrated in FIG. 2 to thereby become the AI recognition model 155.

When an image obtained by capturing a specific product is input to the AI recognition model 155 mounted in the electronic device 100, the AI recognition model 155 outputs product information corresponding to the input image. Here, the product information may include a trademark (brand) of a corresponding product and/or a source of the product. Specifically, when an image is input to the AI recognition model 155, the AI recognition model 155 may output a plurality of probability values by product information, which are classified in advance, may determine product information having the greatest probability value among output probability values by product information as product information corresponding to the input image, and may output the determined product information.

Referring to FIG. 1 again, the electronic device 100 transmits product information, which is output from the AI recognition model 155 illustrated in FIG. 2, to the server 900. More specifically, the electronic device 100 may convert product information output from the AI recognition model 155 illustrated in FIG. 2 into a query form and may transmit the query to the server 900. That is, the electronic device 100 does not transmit the captured image to the server 900, but transmits only product information output from the AI recognition model 155 to the server 900. To this end, the electronic device 100 includes a communication module 170 for transmitting the output product information to the server 900 via the communication network 500.

The processor 150 receives product information that is output from the AI recognition model 155 and provides it to the communication module 170. The communication module 170 may transmit the provided product information to the server 900 via the communication network 500.

The electronic device 100 may receive shopping information including lowest price information from the server 900 via the communication network 500 and display the received shopping information on a screen of the electronic device 100. Specifically, when receiving shopping information through the communication module 170, the processor 150 provides the received shopping information to a display module 120 of the electronic device 100, and the display module 120 may display the provided shopping information on the screen of the electronic device 100.

The electronic device 100 includes a camera module 180. The electronic device 100 may acquire a predetermined image through the camera module 180. The obtained image may be input to the AI recognition model 155 by the processor 150. Here, the obtained image may be one of two types of product image. One type of product image is an image (or photographic image) obtained by a user moving the electronic device 100 to display a specific product (e.g., hand cream) on a camera-working screen and then pressing a take-photo button. The other type of product image is an image (or real-time image) obtained in real time when a specific product (e.g., the hand cream) is displayed on the camera-working screen by the user moving the electronic device 100. The latter-type image, unlike the former-type image, is not stored in a photo library, so there is an advantage in that a user does not have to open the photo library and delete it later. In addition, since the AI recognition model 155 can recognize several to tens of images per second, it is advantageous in that product information can be recognized within a short time even with the latter-type image.

The electronic device 100 is installed with a camera-associated app that can drive and control the camera module 180. Here, the camera-associated app may be a camera app which is installed by default in the electronic device 100 or a shopping app which is downloaded and installed in the electronic device 100 by a user. The shopping app may drive and control the camera module 180 of the electronic device 100. Here, the camera-associated app is not limited to acquiring a product image only through the camera module 180. Specifically, the camera-associated app may acquire product information through a user input mode (a virtual keyboard or voice input) rather than the camera module 180 according to a user selection.

The communication network 500 may provide product information received from the electronic device 100 to the server 900 and may provide shopping information including lowest price information received from the server 900 to the electronic device 100.

The server 900 may receive product information provided from the electronic device 100 via the communication network 500 and may output shopping information including lowest price information corresponding to the received product information in real time. Then, the output shopping information is transmitted to the corresponding electronic device 100 via the communication network 500.

The server 900 may store shopping information for each of a plurality of products in advance and may output shopping information of a corresponding product in response to a request for shopping information of the corresponding product from the electronic device 100 in real time. Here, the shopping information by product may be updated in real time or periodically, and the updated shopping information by product may be stored in the server 900.

The server 900 may update the AI recognition model 155 mounted in the electronic device 100. Specifically, the server 900 may change a parameter (weight w) and/or a bias (b) of the artificial neural network of the AI recognition model 155. As the AI recognition model 155 is updated, a recognition rate of product information may be improved. The processor 150 of the electronic device 100 may receive update information for updating the AI recognition model 155 from the server 900 and may update the AI recognition model 155 based on the received update information.

Figure 6:
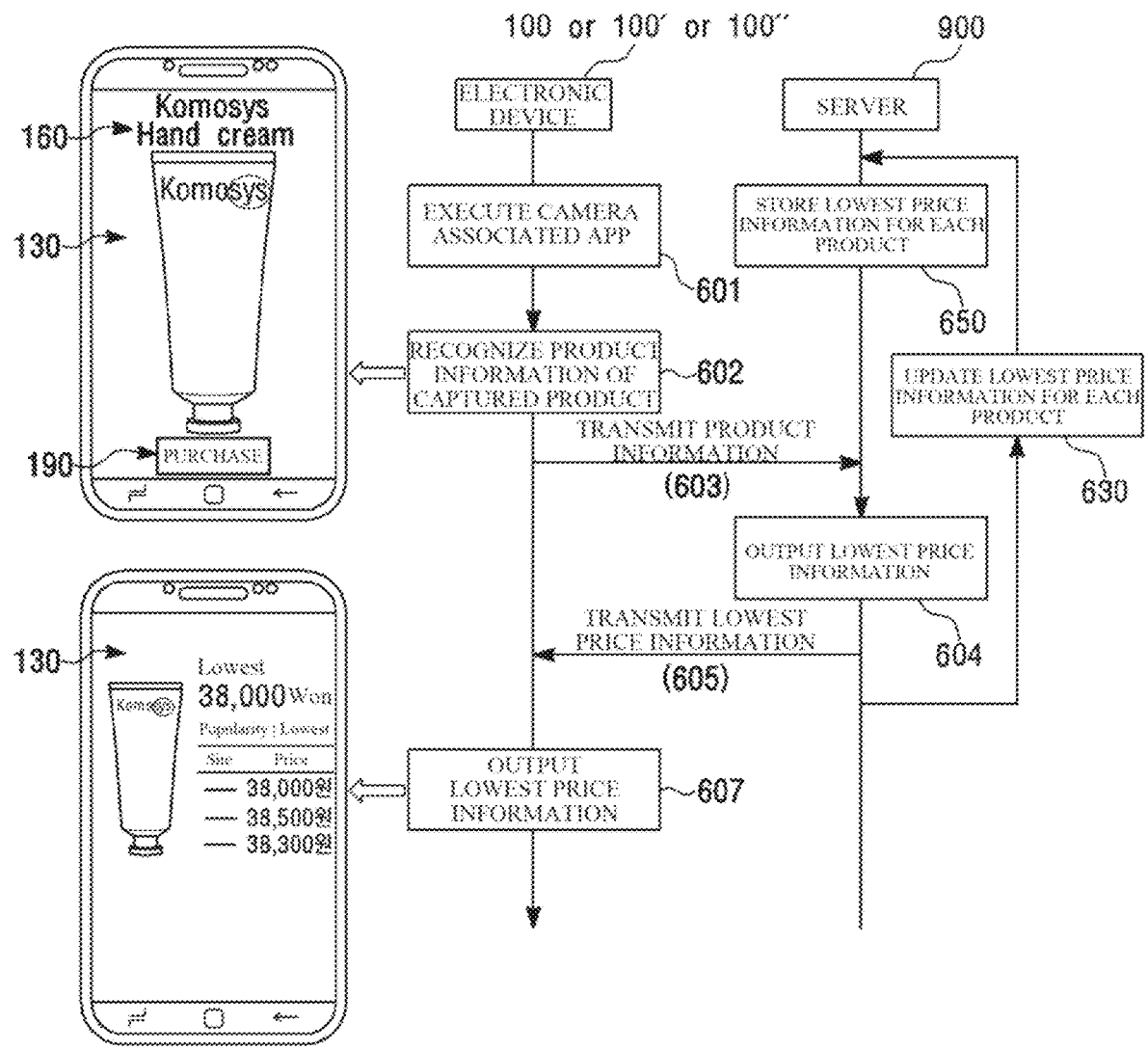
FIG. 6 is a flowchart of the method for providing shopping information by product according to an embodiment of the present disclosure illustrated in FIG. 5.

FIG. 5 illustrates a method for providing shopping information by product according to an embodiment of the present disclosure, and FIG. 6 is a flowchart of the method illustrated in FIG. 5.

Referring to FIGS. 5 to 6, a camera-associated app which is installed in the electronic device 100 by a user is executed in step 601. Here, the camera-associated app may be a camera app which is installed by default in the electronic device 100 or a shopping app which is downloaded and installed by a user and which can drive and control the camera module 180 of the electronic device 100.

When the camera-associated app is executed in the electronic device 100 in step 601, a camera-working screen is displayed on a screen 130 of the electronic device 100 as illustrated in FIG. 5. Here, a product image can be obtained in either of two methods. One method is a method in which a user moves the electronic device 100 to display a specific product (e.g., hand cream) on the camera-working screen and then presses a take-photo button so that the camera-associated app acquires an image (or photographic image). The other method is a method in which a camera-associated app acquires an image (or a real-time image) in real time in a state where a user moves the electronic device 100 and a specific product (e.g., the hand cream) is displayed on the camera-working screen. The latter method, unlike the former method, has an advantage in that a user does not have to delete a photo image stored in a photo library later because the photo image is not stored in the photo library. In addition, since the AI recognition model 155 can recognize several to tens of images per second, there is an advantage in that product information can be recognized within a short time even with the latter method.

Meanwhile, the camera-associated app described in step 601 is not limited to acquiring product images only through the camera module. Specifically, the camera-associated app may acquire product information through a user input mode (a virtual keyboard or voice input) rather than a camera module according to a user selection.

The processor 150 of the electronic device 100 provides the obtained image to the AI recognition model 155, and the AI recognition model 155 recognizes product information 160 of an input image in step 602. The recognized product information 160 may include a trademark (brand) of a product existing in the input image and a source of the product.

Here, the processor 150 may display the product information 160 recognized by the AI recognition model 155 on the screen 130 to show the product information 160 recognized by the AI recognition model 155 to a user who uses the electronic device 100. In this case, the processor 150 may display a shape image of a corresponding product together with the product information 160 output by the AI recognition model 155 on the screen 130.

In addition, the processor 150 may display a predetermined purchase input window 190 which prompts a user to purchase a corresponding product on the screen 130. Here, when the user touches the purchase input window 190, that is, when a user input is received through the purchase input window 190, the processor 150 may transmit the recognized product information to the server 900. Meanwhile, if the user does not touch the purchase input window 190 within a predetermined time or if the user moves the electronic device 100 to take another screen, the recognized product information may not be transmitted to the server 900.

Meanwhile, in step 602, if the AI recognition model 155 does not recognize product information from the input product image, the AI recognition model 155 notifies the processor 150 of recognition failure, and the processor 150 may output recognition failure information on the screen 130. Here, together with the recognition failure information, the processor 150 may display on the screen 130 a user input window (not shown) through which product information can be obtained directly from a user. When a user touches the user input window, a virtual keyboard may be executed or a user input mode to enable voice input may be provided on the screen 130.

Alternatively, in step 602, when the AI recognition model 155 incorrectly recognizes product information from the input product image, the user may select an error input window (not shown), which may be provided on the screen 130. When the error input window is selected, the processor 150 may provide the user input mode described above.

The processor 150 of the electronic device 100 may perform a control operation whereby the product information recognized by the AI recognition model 155 is transmitted, in step 603, to the server 900 through the communication module 170. Here, the processor 150 may process the product information recognized by the AI recognition model 155 into information in the form of a query and transmit the query to the server 900.

The server 900, which has received the product information, outputs shopping information corresponding to the received product information in step 604. Here, the shopping information may include lowest price information corresponding to the product information.

The server 900 transmits, in step 605, the shopping information including the lowest price information to the electronic device 100 via the communication network 500. Here, the server 900 may process the shopping information into information in the form of a query and transmit the query to the electronic device 100.

The electronic device 100 receives the shopping information including the lowest price information from the server 900 through the communication module 170. The processor 150 of the electronic device 100 outputs, in step 607, the received shopping information on the screen 130 of the electronic device 100. Here, the processor 150 may display the shopping information including the received lowest price information on the screen 130 in a preset manner, as illustrated in FIG. 6.

When the user selects a desired shopping mall based on the lowest price information displayed on the screen 130 of the electronic device 100, the processor 150 may display a purchase page for a corresponding product of the selected shopping mall on the screen 130.

Meanwhile, the server 900 stores shopping information including lowest price information by product in advance, in step 650. In addition, the server 900 may update, in step 630, and store shopping information including lowest price information by product in real time or periodically.

In addition, the server 900 may also transmit shopping information corresponding to product information provided from electronic devices 100' and 100", that is, other than the electronic device 100, to the other electronic devices 100' and 100".

As described above, in a method for providing shopping information by product according to an embodiment of the present disclosure, since an image containing a product image is obtained through the camera module 180 by executing a camera-associated app installed in the electronic device 100, and product information of the product of the obtained image is obtained using the AI recognition model 155, users can acquire a trademark (brand) and source of their desired product in a short time and in near real time through the AI recognition model 155 based on the artificial neural network without searching through a virtual keyboard window.

In addition, in the method for providing shopping information by product using an artificial neural network according to an embodiment of the present disclosure, since product information obtained through the AI recognition model 155, for example, product information in the form of a query, is transmitted to the server 900 via the communication network 500, and the server 900 searches for shopping information including lowest price information corresponding to the transmitted product information and provides the information to the electronic device 100 via the communication network 500, it is unnecessary to transmit a captured product image to the server 900 and unnecessary for the server 900 to analyze the captured product image, so that there is an advantage of providing shopping information including lowest price information to a user in real time.

The features, structures and effects and the like described in the embodiments are included in an embodiment of the present disclosure and are not necessarily limited to one embodiment. Furthermore, features, structures, effects and the like provided in each embodiment can be combined or modified in other embodiments by those skilled in the art to which the embodiments belong. Therefore, contents related to the combination and modification should be construed to be included in the scope of the present disclosure.

Although the embodiments of the present disclosure were described above, these are merely examples and do not limit the present disclosure. Further, the present disclosure may be changed and modified in various ways, without departing from the essential features of the present disclosure, by those skilled in the art. For example, the components described in detail in the embodiments of the present disclosure may be modified. Further, differences due to the modification and application should be construed as being included in the scope and spirit of the present disclosure, which is described in the accompanying claims.

Although the embodiments of the present disclosure were described above, these are merely examples and do not limit the present disclosure. Further, the present disclosure may be changed and modified in various ways, without departing from the essential features of the present disclosure, by those skilled in the art. For example, the components described in detail in the embodiments of the present disclosure may be modified. Further, differences due to the modification and application should be construed as being included in the scope and spirit of the present disclosure, which is described in the accompanying claims.

[National R&D Project Supporting This Invention]
[Task Identification Number] 1711199953
[Task Number] R-20220729-015370
[Name of Ministry] Ministry of Science and ICT
[Name of Project Management (Specialized) Institution] National IT Industry Promotion Agency
[Research Project Title] Intensive Fostering of Artificial Intelligence Semiconductor Innovation Companies
[Research Task Title] HW Customization and Edge Device Application SW Development of Mobile AI Camera Semiconductors
[Contribution Rate] 1/1
[Name of Organization Performing the Task] Eyenix Co., Ltd.
[Research period] 2024.05.01 ~ 2024.12.31

What is claimed is:

1. A method for providing shopping information, the method comprising:
    acquiring, a product image using a camera module;
    displaying, the product image on a display module linked to the camera module;
    recognizing, a product information including a trademark and a product information label corresponding to the product image by inputting the product image into an AI recognition model including an artificial neural network model;
    converting, the product information into a query when the product information is recognized by the AI recognition model;
    transmitting, the query to a server via a communication module;
    receiving, a shopping information corresponding to the product information with respect to one or more shopping malls from the server via the communication module; and
    displaying, the shopping information on the display module,
    wherein parameters of the artificial neural network are updated periodically by receiving the parameters via the server.

2. The method of claim 1,
    wherein the parameters of the artificial neural network are updated to increase a recognition rate of the product information.

3. The method of claim 1,
    wherein the AI recognition model is processed by a neural processing unit.

4. The method of claim 1,
    wherein the product image is acquired in real time.

5. The method of claim 1,
    wherein the shopping information includes lowest price information.

6. The method of claim 1,
    wherein the product image is not stored in a photo library.

7. The method of claim 1, further comprising:
    displaying, on the display module, a purchase input window corresponding to the one or more shopping malls.

8. A method for providing shopping information, the method comprising:
    acquiring, a product image using a camera module;
    displaying, the product image on a display module linked to the camera module;
    recognizing, a product information including a trademark and a product information label corresponding to the product image by inputting the product image to an AI recognition model including an artificial neural network model;
    converting, the product information into a query when the product information is recognized by the AI recognition model;
    transmitting, the query to a server via a communication module;
    receiving, a shopping information corresponding to the product information with respect to one or more shopping malls from the server via the communication module; and
    displaying, the shopping information on the display module,
    wherein the parameters of the artificial neural network are updated in real time by receiving the parameters via the server.

9. The method of claim 8,
    wherein parameters of the artificial neural network are updated to increase a recognition rate of the product information.

10. The method of claim 8,
    wherein the AI recognition model is processed by a neural processing unit.

11. The method of claim 8,
    wherein the product image is acquired in real time.

12. The method of claim 8,
    wherein the shopping information includes lowest price information.

13. The method of claim 8,
    wherein the product image is not stored in a photo library.

14. The method of claim 8, further comprising:
    displaying, on the display module, a purchase input window corresponding to the one or more shopping malls.

15. An electronic device comprising:
a camera module configured to acquire a product image;
a display module, electronically connected to the camera module, configured to display the product image;
a neural processing unit configured to process an AI recognition model including an artificial neural network model configured to recognize product information including a trademark and a product information label of the product image; and
a communication module configured to transmit a query of the product information to a server and receive shopping information corresponding to the product information with respect to one or more shopping malls from the server,
wherein the shopping information is configured to be displayed on the display module, and
wherein the parameters of the artificial neural network are configured to be updated by receiving the parameters via the server.

16. The electronic device of claim 15,
wherein the parameters of the artificial neural network are updated to increase a recognition rate of the product information.

17. The electronic device of claim 15,
wherein the product image is acquired in real time.

18. The electronic device of claim 15,
wherein the shopping information includes lowest price information.

19. The electronic device of claim 15,
wherein the product image is not stored in a photo library.

20. The electronic device of claim 15,
wherein the display module is configured to display a purchase input window corresponding to the one or more shopping malls.

* * * * *